United States Patent [19]

Dillon et al.

[11] Patent Number: 4,534,723
[45] Date of Patent: Aug. 13, 1985

[54] CUTTING DEVICE FOR THE PRECISION TRIMMING OF THE EDGE OF A CENTRIFUGALLY CAST LENS

[75] Inventors: Michael A. Dillon, Rockaway Point; David L. Rawlings, Bayville, both of N.Y.

[73] Assignee: International Hydron Corporation, Woodbury, N.Y.

[21] Appl. No.: 575,250

[22] Filed: Jan. 30, 1984

[51] Int. Cl.³ .................. B29C 17/08; B29C 25/00
[52] U.S. Cl. ....................................... 425/289; 83/187;
    408/19; 408/95; 408/146; 425/292; 425/808
[58] Field of Search ............ 425/289, 292, 295, 808;
    29/527.6; 264/2.7, 163; 83/187; 408/196, 201,
    202, 203, 19, 95, 146; 82/11, 20

[56] References Cited

U.S. PATENT DOCUMENTS

| | | | |
|---|---|---|---|
| 673,847 | 5/1901 | Rückl | 425/292 |
| 2,237,744 | 4/1941 | Mullen | 525/808 |
| 2,990,574 | 7/1961 | De Carle | 425/808 |
| 3,005,234 | 10/1961 | Oriani et al. | 425/808 |
| 3,224,038 | 12/1965 | Budesheim | 425/292 |
| 3,365,988 | 1/1968 | Karlan | 408/196 |
| 3,391,588 | 7/1968 | Brown | 83/187 |
| 3,514,908 | 6/1970 | Herbert et al. | 51/284 |
| 3,736,115 | 5/1973 | Blum | 51/284 |
| 3,832,920 | 9/1974 | Wrue | 82/20 |
| 3,835,596 | 9/1974 | Wrue | 51/284 |
| 3,871,610 | 3/1975 | Balsam | 425/808 |
| 3,896,688 | 7/1975 | Wrue | 82/1 C |
| 4,121,896 | 10/1978 | Shepherd | 425/808 |
| 4,407,766 | 10/1983 | Haardt et al. | 425/808 |

Primary Examiner—Willard E. Hoag
Attorney, Agent, or Firm—Vincent P. Pirri

[57] ABSTRACT

A cutting device for the precision trimming of a symmetrical portion of the peripheral edge of a centrifugally cast lens secured within a cavity of a female mold without the need for extensive and complex prior alignment of the cutting tool with the lens.

8 Claims, 7 Drawing Figures

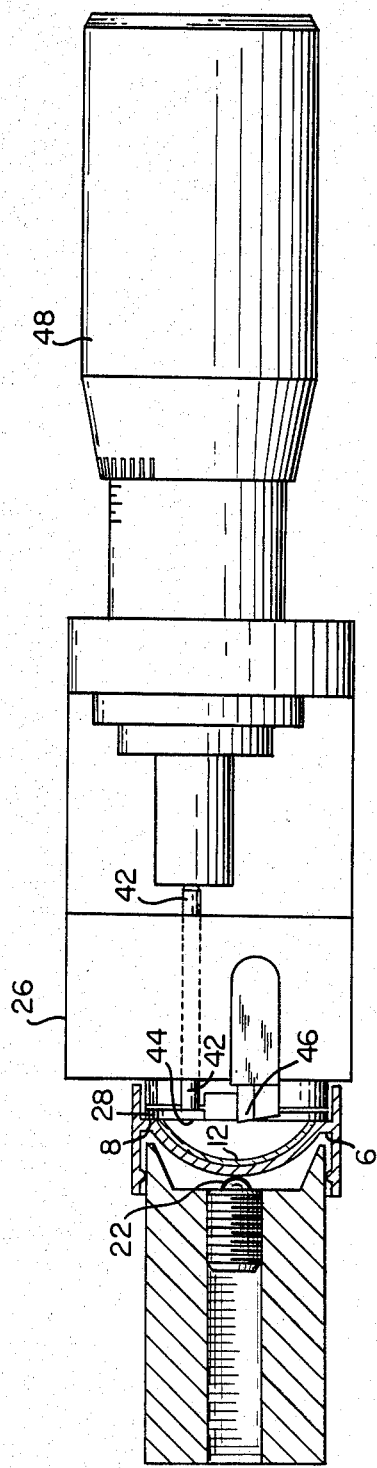
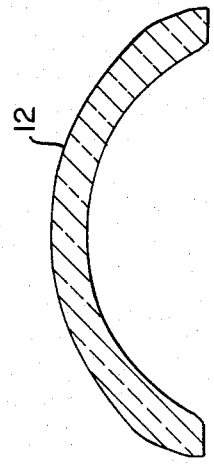

CUTTING DEVICE FOR THE PRECISION TRIMMING OF THE EDGE OF A CENTRIFUGALLY CAST LENS

DESCRIPTION

1. Technical Field

The present invention relates to a cutting device for precision trimming a selected portion of the peripheral edge of a centrifugally cast lens while it is secured within a cavity of a female mold. The invention also relates to a method for the economical and precision trimming of a selected portion of the peripheral edge of a centrifugally cast lens while it is secured within a cavity of a female mold.

2. Background Art

It is known that the polymerization casting of axially symmetrical articles, such as contact lenses, can be performed by using equipment in which individual molds are arranged in a carousel or in a vertical stack configuration. These individual molds, characterized by an outer cylindrical wall and a mold cavity with an exposed concave bottom surface and containing a liquid polymerizable mixture in the cavity, are caused to rotate about their vertical axis at a rotational speed (and under polymerization conditions) sufficient to create a centrifugal force which causes a radially outward displacement of the liquid reactants in the mold. By maintaining the rotating mold(s) under predetermined and known polymerization conditions, the outwardly displaced liquid reactants are caused to polymerize to a solid polymeric contact lens. The resulting lens is characterized by a convex optical surface which corresponds to the concave surface of the mold and a concave optical surface whose geometry has been created, to a significant degree, by the centrifugal force(s) employed during the polymerization cycle.

In the centrifugal casting of contact lenses on a commercial scale, it is preferred for the attainment of good yield to effect the polymerization or curable reaction under an inert gaseous medium such as argon or nitrogen. This is due to the fact that the oxygen component of air entrained within the polymerization column can inhibit the polymerization reaction and adversely affect the quality and acceptability of the contact lens product. A controlled feed of nitrogen through the polymerization column will purge any entrained air in the polymerization zone and provide an inert environment for conducting the polymerization process.

A novel commercial device for centrifugally casting of articles such as lenses is disclosed in copending U.S. application Ser. No. 490,634 filed on May 2, 1983 by the same assignee of the subject application. The disclosure made in this application, to the extent intended herein, is incorpoarted by reference as if set out in full text. Specifically, the device disclosed in this copending application relates to a device for the centrifugally casting of articles comprising a rotatable polymerization tube (column) adapted for rotation about a vertical (longitudinal) axis and adapted for receiving in vertical series a plurality of molds containing a polymerizable or curable compostion; securing means for securing a plurality of molds in vertical series in an interference fitting and sliding relationship within said tube, said securing means being adapted to concentrically dispose said molds to the vertical axis of said polymerization tube; gas flow means associated with the inner surface of said tube and the outer wall of said molds to accommodate a flow of a gaseous medium through said polymerization tube; and said device being operable such that the rotation of said tube causes the synchronized rotation of said molds while maintaining the concentricity of said molds to the vertical axis of said polymerization tube until at least the polymerizable or curable composition in each mold is spin cast into a predetermined shaped article.

Any fluid polymerizable, curable or moldable reactant or mixture with/without an inert or reactive solvent which is/are capable of being displaced outwardly due to the rotation of the column, i.e., by the resultant centrifugal forces, can be employed to fabricate centrifugally cast lenses. The medium comprising the reactant(s) constitutes a homogenous liquid and is capable of forming a desired shaped article during the centrifugal casting operation. The article may be opaque, translucent or transparent depending on the ultimate use of the cast article formed. On the other hand, for example, it is a requirement that soft hydrophilic contact lenses be fully transparent, of good optical quality, soft and resilient as well as possessing other necessary and desirable characteristics.

In particular, a centrifugal casting device coupled to gas feeding means can be utilized in the manufacture of a wide variety of contact lenses which can be symmetrical or asymmetrical; hard, flexible or soft; water absorptive or non-water absorptive; low, medium, or high oxygen permeability or transportability; and the like. By choosing suitably designed mold cavities or bottoms there can be obtained a wide variety of modified lens shapes, e.g., toric, bifocal, truncated and/or ballasted contact lenses. A wide variety of materials or construction can be employed to fabricate the molds; see, for example, U.S. Pat. No. 3,660,545. For the preparation of hydrophilic articles such as soft contact lenses a mold fabricated of a thermoplastic material, such as polypropylene is suitable. To insure proper wetting of the optical surface of the mold by the lens-forming mixture it is desirable to first pretreat or hydrophilize the said surface by known methods.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerizatin or curing proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Patents: U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalysts(s).

The shape of a lens blank may be controlled not only by the size and shape of the mold, but also by the amount and nature of the components comprising the lens-forming mixture.

Although the above-described centrifugal casting process does produce precision lenses, time-consuming steps must be taken to oftentimes remove undesirable flash or the like in order to make the lenses comfortable to the wearer. Generally, the lens is secured on a lathe and then a diamond cutting tool is used to trim a peripheral edge segment of the lens. Since the lens is generally held in the lathe spindle by use of a collette or mandrel and then rotated as the cutting tool is brought into contact with the edge of the lens, the resulting edge profile is dependent upon the profile of the cutting tool and the path the tool takes when contacting the revolving lens. Any deviation in the alignment of the cutting tool and the lens due to misalignment of the mold on the lathe could result in an asymmetrical trim of the peripheral edge segment of the lens. This could result in unacceptable soft contact lenses being produced.

OBJECTS OF THE INVENTION

Accordingly, one or more objects will be achieved by the practice of the invention.

Objects of the invention are for the provision of novel cutting devices and novel methods for symmetrically trimming the peripheral edge portion of a centrifugally cast lens.

Another object of the invention is to provide a novel cutting device employing support means associated with cutting edge means for the precision trimming of a selected segment of the peripheral edge of a soft centrifugally cast lens secured in a female mold.

Still another object of the invention is to provide a method for the precision trimming of a selected segment of the peripheral edge of a centrifugally cast lens secured in a female mold.

Still another object of the invention is to provide a method for the precision trimming of a selected segment of the peripheral edge of a centrifugally cast soft contact lens which is not labor intensive or capital intensive, which can be operated in an efficient manner on a continuous basis, which is relatively small in size as to be readily portable and/or obviates various disadvantages of the art.

The foregoing as well as additional objects will become fully apparent from the following description and the accompanying drawings.

DISCLOSURE OF THE INVENTION

The invention relates to a cutting device for trimming a selected peripheral edge segment of a lens secured within a mold, said mold having a flange with an annular face disposed normal to the axis of the mold and said annular face defining a cavity, said cavity having a base into which the lens is secured and the exposed outer surface of the base disposed within a peripheral skirt extended from one end of the mold; said cutting device comprising:
  (a) securing means adapted to be disposed and secured within the extended skirt of the mold, said securing means having a centrally disposed projected member adapted to abut the outer surface of the base of the cavity at the longitudinal axis of the mold so that said secured mold can pivot on said projected member;
  (b) cutting support means having a longitudinal axis and a support base which is adapted to seat and slide upon the annular face of the flange of the mold;
  (c) cutting means secured to the cutting support means, said cutting means having a cutting edge which is radially offset from the longitudinal axis of the cutting support means and projects beyond the support base of said support means by a predetermined amount;
  (d) rotatable means for rotating at least one of the means selected from the group consisting of the securing means and the cutting support means; and
  (e) means for permitting relative movement between the securing means and the cutting support means from a first position where said support base of the cutting support means is axially aligned with and spaced apart from the face of the flange of the mold such that the cutting edge is disposed adjacent at least a peripheral edge segment of the lens, to a second position in which the cutting edge contacts said at least peripheral edge segment of the lens to remove a portion of the lens until said support base of the cutting support means contacts and slides on the annular face of the flange of the pivotably secured mold so as to insure proper alignment of the mold with the cutting edge and thereby impart a precision trimming of the peripheral edge segment of the lens.

Through the cooperative association of the support base of the cutting support means and the flange of the mold, the cutting edge of the cutting means can preform a symmetrical and precision trimming of a selected segment of the peripheral edge of a lens secured within a female mold. Specifically, since the cutting edge of the cutting menas is disposed a fixed distance below the support base, then when the support base contacts and slides upon the annular face of the flange of the mold, the cutting edge will be fixed so as to impart a precision trimming of the peripheral edge of the lens. With the mold pivotally mounted on a mandrel or the like, the support base of the cutting support means will pivot the mold into axial alignment with the support means so that the cutting edge of the tool can impart a symmetrical trim to the peripheral edge of the lens.

Preferably, the centrally disposed projected member of the securing means should be curved or comprise a spherical rotatable bearing or the like so as to facilitate the pivoting of the mold for proper axial alignment with the support means. Preferably the mold should have an extended skirt surrounding the annular face of the flange to provide a female receptical for the support base of the securing means which will facilitate the initial alignment of the support base of the securing means with the annular face of the flange. Thus when the support base containing the projected cutting edge is placed into the extended skirt of the mold, the cutting edge will contact at least the peripheral edge of lens and begin to remove a selected portion therefrom. As the support base contacts and slides upon the annular face of the flange, the mold, if required, will pivot to axially align itself with the support means thereby insuring that the cutting edge will impart a symmetrical trim to the edge of the lens. Generally, a portion of the inner face of the flange may be removed by the cutting edge along with the precision removal of the peripheral edge of the lens. Through the cooperative association of the support base of the support means and the flange of the mold, the cutting edge will impart a precision trim to the peripheral edge portion of the lens such that the cut of the lens is concentric with the outer diameter of the lens due to the precise alignment of the cutting edge with the peripheral edge of the lens.

Preferably, the support base of the cutting support means should be adjustable so that the projection of the cutting edge below the support base can be precisionally regulated to any desired distance. It is also possible to have the support base fixed and then provide means associated with the cutting tool for regulating and adjusting the distance the cutting edge will project below the support base. In either embodiment, the cutting edge could be easily disassembled from the support means to facilitate the sharpening of the cutting edge when desired or to replace the cutting edge when necessary.

To impart relative rotational motion between the securing means (mandrel) and the cutting support means to effect the necessary trimming of the lens, it is preferred to have the securing means rotated while the cutting support means is restrained from rotational motion. In the preferred embodiment, the cutting support means would be linearly moved into alignment and engagement with the rotatable female mold whereupon the cutting edge would contact and remove a precise portion of the peripheral edge of the lens. When the base of the cutting support means contacts and slides upon the face of the flange in the female mold, the trimming operation will be complete and the cutting support means can be linearly removed from the female mold. The mold can be taken off the support means and the lens can then be removed in a condition ready for use, except for cleaning and perhaps a buffing of the lens edge. Due to the small size of a contact lenses and specifically to the extremely small size of the edge portion of the lens to be trimmed, it would be rather difficult to determine when and if trimming has been complete without the cooperative association between the base of the cutting support means and the annular face of the flange of the mold.

Another aspect of the invention is directed to a method of trimming a selected peripheral edge segment of a lens secured within a mold, said mold having a flange with an annular face disposed normal to the axis of the mold and said annular face defining a cavity, said cavity having a base into which the lens is secured and the exposed outer surface of the base being disposed within a peripheral skirt extended from one end of the mold, said method comprising the steps:
  (a) securing one end of the mold on a mandrel such that the axially area of the base of the cavity contacts and is adapted to pivot on a centrally projected member on the mandrel;
  (b) orientating a cutting means having an end base adapted for seating and sliding upon the face of the annular flange of the mold and having a projected cutting edge in opposed facing relation to the lens secured within the mold;

(c) imparting rotational motion between the lens secured in the female mold and the cutting means; and (d) projecting said base and cutting edge of the cutting means into the mold containing the lens such that said cutting edge contacts at least a peripheral edge segment of the lens and continuing the projection of the cutting means until the base contacts and slides upon the annular face of the flange in the mold so as to insure proper alignment of the mold with the cutting edge thereby insuring that a precision trimming of the peripheral edge segment of the lens has been made.

BRIEF DESCRIPTION OF THE DRAWINGS

The present invention will become more apparent from the following description thereof when considered together with the accompanying drawing which is set forth as being exemplary of embodiments of the present invention and is not intended in any way to be limited thereof and wherein:

FIG. 5 is side elevation, partly in cross-section, of the cutting support block and blade member of FIG. 3 aligned within the mold secured in the mandrel of FIG. 2 and positioned for imparting a symmetrical trim to the peripheral edge of the lens secured in said mold.

FIG. 6 is a side elevation in cross section of a centrifugally cast lens that was trimmed by the cutting device of this invention.

As shown in FIG. 1, the female mold 1 comprises a cylindrical support 2 having disposed therein a female concave molding surface 4 defined by an annular flange 6 having an annular face 8 normal to the axis of mold 1. Extended below flange 6 is a cylindrical skirt 9 having an inwardly disposed annular rim 10. Secured in female molding surface 4 is a centrifugally cast lens 12 prepared as generally discussed above. As shown in FIG. 1, the peripheral edge 13 of lens 12 terminates with a rather sharp edge 14 which could cause discomfort to the wearer of the lens and therefore should be trimmed.

Female mold 1 of FIG. 1 is shown in FIG. 2 pivotably secured on mandrel 16. Specifically, mandrel 16 comprises a cylindrical block 18 terming with a cylindrical tapered skirt 20. Disposed axially within skirt 20 is a ball bearing 22 which is secured by conventional means to block 18. Ball bearing 22 can be adjusted if desired, using set screw 23. The outer diameter of skirt 20 is slightly larger than the inner diameter of rim 10 so as to provide a friction fit for mandrel 16 when it is projected within cylindrical skirt 9 to contact rim 10. As shown in FIG. 2, the outer base surface 24 of molding surface 4 contacts and abuts rotatable ball bearing 22. This securement of mold 1 on mandrel 16 permits mold 1 to pivot slightly on ball bearing 22 so as to allow proper axially alignment of mold 1 on mandrel 16.

FIGS. 3 and 4 show a block 26 terming with a projected arcuate support base 28 subtending an angle of about 330°. The extended portion of support base 28 is cut normal to the longitudinal axis of block 26 to provide wing segments 30–32 disposed on either side of an elongated blade mounting slot 34. Positioned in slot 34 is blade holder 36 which is secured therein using conventional screw means. Specifically, screws 38 (shown as broken lines) secure blade holder 36 to block 26. A segment of the base 28 is removed wing 32 so that wing 32 can be flex parallel to the axis of block 26. Disposed in block 26 and aligned with wing 32 is an opening accommodating a moveable elongated pin 42 that can be used to contact and extend wing 32 from face 44 of base 28. A conventional micrometer can be coupled to elongated pin 42 so that wing 32 can be precision biased to an exact distance beyond face 44. As illustrated in FIGS. 3 and 4, blade holder 36 had a cutting edge 46 radially offset from the longitudinal axis of block 26 and extended beyond face 44 of support base 28. By adjusting wing 32, the distance cutting edge 46 extends beyond face 44 can be regulated to provide a depth of cut "X" as shown in FIG. 4. As also shown in FIG. 4 the depth of cut that can be made will vary from a maximum of 'Y' to an amount depending on the degree and distance wing 32 is biased beyond face 44. Thus, the degree and depth of cutting or trimming of an article, such as a lens, by cutting edge 46 can be regulated.

As shown in FIG. 5, the diameter of support base 28 is equal to or slightly less than the internal diameter of mold 1 so that support base 28 can seat within mold 1. This projection of support base 28 into mold 1 will initially provide a rather good alignment of cutting edge 46 over the peripheral edge of lens 12. Preferably, as mandrel 16 is rotated by conventional means not shown and support base 28 is projected by conventional means not shown into mold 1, cutting edge 46 will contact and remove a portion of the outer periphery of lens 12. As support base is further projected into mold 1, face 44 will contact and slide upon face 8 of mold 1. This cooperative contact arrangement will pivot mold 1 into alignment with the longitudinal axis of block 26, if necessary, to insure that a symmetrical trim is made at the peripheral edge of lens 12. When face 44 of support base 28 contacts and slides upon face 8 of mold 1, the trimming operation will be completed. Generally, in addition to the trimming of a symmetrical edge portion of the lens, a portion of face 8 of flange 6 may also be removed as shown in FIG. 1 by the broken lines. As stated above and as shown in FIG. 5, micrometer 48 is used to precisionally adjust the projection of wing 32 beyond face 44 of support base 28 which determining the depth of cut to be made by cutting edge 46.

After trimming is completed, lens 12 is generally buffed and then removed from the mold. A lens 12 is shown in FIG. 6 after being removed from the mold.

Figure 1:
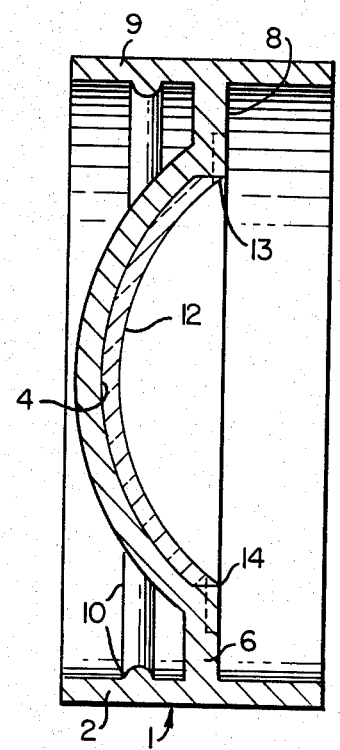
FIG. 1 is a side elevation in cross section of a female mold having a concave surface.
Figure 7:
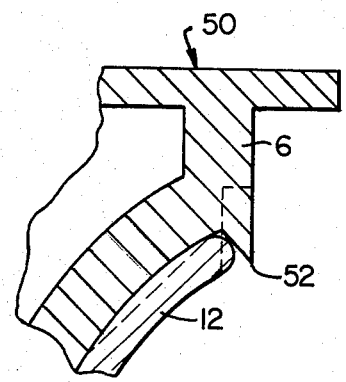
FIG. 7 is a partial side elevation in cross section of another type of female mold having a concave surface.

FIG. 7 shows a female mold 50 similar to mold 1 in FIG. 1 having similar parts identified with the same reference numbers except that flange 6 terminates with a tapered rim 52 to provide a barrier for lens 12 when lens 12 is being centrifugally cast. When using this type of female mold 50, the cutting edge 46 will have to remove at least a portion of rim 52 before trimming lens 12 as shown by the broken lines. After trimming of the lens 12, the peripheral edge of the lens could be ball buffed to produce a lens as basically shown in FIG. 6.

The molds are themselves preferably manufactured from thermoplastic materials, for example low density polyethylene or polypropylene. These and other suitable materials are described in U.S. Pat. Nos. 4,208,365 and 4,121,896, the disclosures of which are fully incorporated herein by reference as if set out in full text.

The cutting method of the invention is not limited to trimming soft plastic contact lenses, i.e., hydrogels and their hydrated state, although these are preferred articles. Also included for trimming are the hard or rigid contact lenses as well as flexible, hydrophobic truncated contacted lenses.

The novel process results in advantages over prior art methods in that a contact lens is centrifugally cast directly from the desired lens-forming material and then precision edge trimmed can be done using the novel device of this invention. Polishing of the optical surfaces is not required although only minimum finishing or buffing of the lens edges may be required in some applications. The overall manufacturing of finished lenses using the novel cutting device is far less labor intensive than with prior procedures, e.g., lathe procedure. As with most soft lenses, the lens will be washed with water to remove any catalyst residue and unreacted monomer, then equilibrated in aqueous or saline solution to attain their final dimensions.

EXAMPLE 1

Polypropylene molds (FIG. 1) having a concave sperical optical surface in the mold cavity was used in the centrifugal casting of contact lens. The mold dimensions was: outside diameter—17 mm; inner diameter above mold cavity—15.6 mm; height of mold—7.5m mm; diameter of mold cavity—13.2 mm; central mold cavity radius—7.7 mm; depth of mold cavity (max.)—3.3 mm; width of circular horizontal mold flange (located between the inner mold wall and mold cavity)—1.2 mm. The hydrophilicity or wettability of the optical surface of the molds was enhanced by treatment in an oxygen, low temperature, plasma chamber for approximately 18 seconds, 50 watts gauge setting (Model LTA-302, Low Temperature Asher, LFE Corporation, Waltham, Mass.). To a series of these molds, there was charged, individually, a metered amount of the lens-forming mixture, i.e., approximately 20 milligrams. The lens-forming mixture (based on total weight) comprised the following recipe:

Components (Parts by Wt.)

2-Hydroxyethyl Methacrylate: 84.6
Ethylene Glycol Dimethacrylate: 1.0
Benzoin Methyl Ether (initiator): 0.2
Glycerol: 14.2

The molds were transported laterally, on a conveyor belt to the inlet end of a rotating Pyrex column which was supported in an upright position by support means. The molds were force fed downwardly, one at a time, into the vertical column by pusher means having a circular nose which engages the mold at the face of the flange of the mold. When the rotating column was filled with molds (capacity can vary, for instance, from 60 to 120 molds), the force feeding of each mold at the inlet end and the removal or ejection of the bottom most mold (containing the shaped lens product) at the outlet end was synchronized to effect a continuous process. The speed of rotation of the column about its vertical axis was about 400 r.p.m. and total residence time of each mold in the column was about 20 minutes. The rotating column was maintained at ambient room temperature, i.e., about 20°-22° C. with nitrogen continually flowing upward into the polymerization column to remove any entrained oxygen in the column. In a so-called "conditioning" zone in the upper portion of the column, centrifugal forces created by the column rotation caused the radially outward displacement of the liquid lens-forming mixture in the spherical mold cavity to be formed into a predetermined lens shape. The "conditioning" of said liquid material was maintained for a period of about 15 minutes in its downward decent in the conditioning zone to the polymerization zone. The polymerization zone of the column was likewise maintained at ambient room temperature. The polymerization reaction was conducted using UV radiation from a source outside the column (UV source: medium pressure, mercury arc, UV emission—300–400 nm, infrared is filtered, and lamp distance is 3 inches). The residence time in the polymerization zone was be about 5 minutes.

Figure 2:
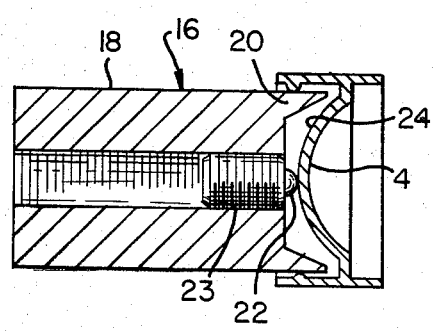
FIG. 2 is a side elevation in cross section of the female mold of FIG. 1 secured on a mandrel.
Figure 3:
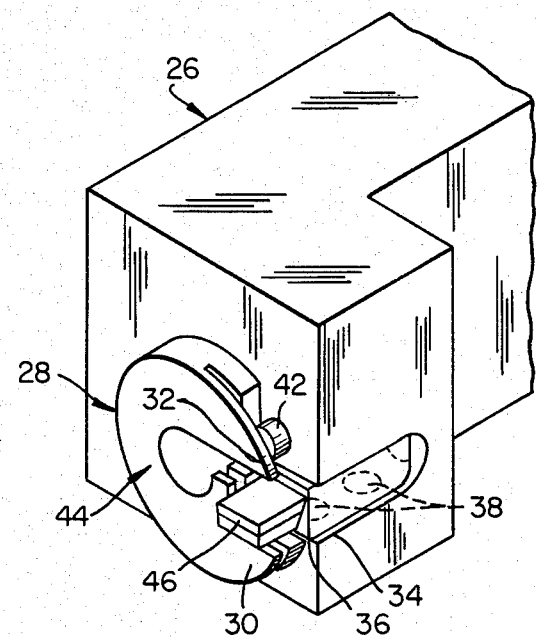
FIG. 3 is a perspective view of a cutting support block and blade member for use in this invention.
Figure 4:
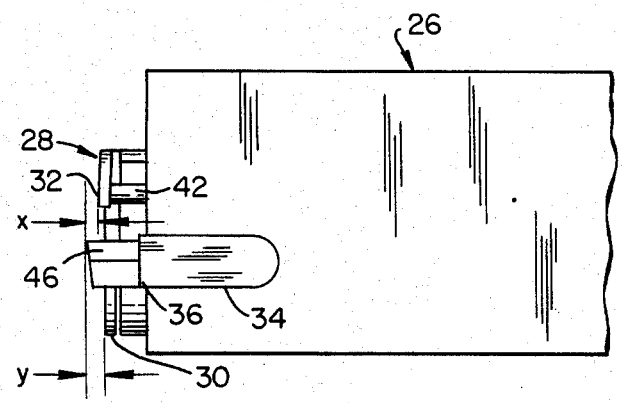
FIG. 4 is a side elevation of the cutting support block and blade member of FIG. 3.

The female mold containing the formed lens secured in the cavity was placed on a rotatable mandrel as shown in FIG. 2. A cutting device as basically shown in FIG. 3 was positioned adjacent to the revolving mandrel and the support base was positioned to contact the annular face of the flange of the mold. This insured that the cutting edge was precisely positioned to trim a selected area of the peripheral edge of the lens as basically shown in FIG. 5. After the trimming and buffing operations were completed, the lens was easily removed from the mold. The finished contact lens was placed in a physiological solution. As meausred on a Nikon Vertexometer, the lens had an optical power of $-3$ diopters. The lens had a center thickness of 0.04 mm and an edge thickness of 0.09 mm. Using the novel cutting device of this invention, the edge of the lens was reduced in thickness by 0.04 mm thereby providing a tapered edge portion for the lens without sharp points that could irritate the eye of the user.

What is claimed is:

1. A cutting device for trimming a selected peripheral edge segment of a lens secured within a mold, said mold having a flange with an annular face disposed normal to the axis of the mold and said annular face defining a cavity, said cavity having a base into which the lens is secured and the exposed outer surface of the base disposed within a peripheral skirt extended from one end of the mold; said cutting device comprising:
    (a) securing means adapted to be disposed and secured within the extended skirt of the mold, said securing means having a centrally disposed projected member adapted to abut the outer surface of the base of the cavity at the longitudinal axis of the mold so that said secured mold can pivot on said projected member;
    (b) cutting support means having a longitudinal axis and a support base which is adapted to seat and slide upon the annular face of the flange of the mold;
    (c) cutting means secured to the cutting support means, said cutting means having a cutting edge which is radially offset from the longitudinal axis of the cutting support means and projects beyond the support base of said support means by a predetermined amount;
    (d) rotatable means for rotating at least one of the means selected from the group consisting of the securing means and the cutting support means; and
    (e) means for permitting relative movement between the securing means and the cutting support means from a first position where said support base of the cutting support means is axially aligned with and spaced apart from the face of the flange of the mold such that the cutting edge is disposed adjacent at least a peripheral edge segment of the lens, to a second position in which the cutting edge contacts said at least peripheral edge segment of the lens to remove a portion of the lens until said support base of the cutting support means contacts and slides on the annular face of the flange of the mold so as to insure proper alignment of the mold with the cutting edge and thereby impart a precision trimming of the peripheral edge segment of the lens.

2. The cutting device of claim 1 wherein at least a portion of the support base of the cutting support means is adjustable parallel to the longitudinal axis of the cutting support means so as to regulate the projected distance of the cutting edge beyond the support base.

3. The cutting device of claim 1 wherein said rotatable means are coupled to the securing means for rotating said securing means about its longitudinal axis.

4. The cutting device of claim 1 wherein said centrally projected member of the securing means is a ball bearing.

5. The cutting device of claim 1 wherein said rotatable means are coupled to the cutting support means for rotating said cutting support means about its longitudinal axis.

6. The cutting device of claim 1 wherein the cutting means is adjustable parallel to the longitudinal axis of the cutting support means so as to regulate the projected distance of the cutting edge beyond the support base of the cutting support means.

7. The cutting device of claim 2 wherein said rotatable means are coupled to the securing means for rotating said securing means about its longitudinal axis.

8. The cutting device of claim 6 wherein the rotatable means are coupled to the securing means for rotating said securing means about its longitudinal axis.

* * * * *